2 Sheets—Sheet 1.

J. W. HILDRETH.
Leather Stuffing Machine.

No. 201,526. Patented March 19, 1878.

WITNESSES:
E. A. Hemmenway
Benj. Andrews, Jr.

INVENTOR:
Joseph W. Hildreth
BY N. C. Lombard
ATTORNEY.

2 Sheets—Sheet 2.

J. W. HILDRETH.
Leather Stuffing Machine.

No. 201,526. Patented March 19, 1878.

WITNESSES:
E. N. Hemmenway
Benj. Andrews, Jr

INVENTOR:
Joseph W. Hildreth
BY N. C. Lombard
ATTORNEY.

UNITED STATES PATENT OFFICE.

JOSEPH W. HILDRETH, OF BOSTON, MASSACHUSETTS.

IMPROVEMENT IN LEATHER-STUFFING MACHINES.

Specification forming part of Letters Patent No. 201,526, dated March 19, 1878; application filed January 11, 1878.

*To all whom it may concern:*

Be it known that I, JOSEPH W. HILDRETH, of Boston, in the county of Suffolk and State of Massachusetts, have invented certain new and useful Improvements in Mills for Stuffing Leather, of which the following, taken in connection with the accompanying drawings, is a specification.

My invention relates to the construction of mills for forcing grease and other stuffing material into leather, and has for its object a more even distribution of heat to all parts of the stuffing-chamber, and a ready means of regulating the temperature within said chamber; and it consists in providing said mill with a double-rolled casing, or adding to the ordinary cylindrical casing of the common mill an outer casing or jacket, completely inclosing the same, and forming between said two casings a hollow chamber, adapted to be filled with steam for heating the contents of the mill, said outer casing or jacket forming a part of and adapted to revolve with the mill, as will be hereinafter described.

My invention further consists in a peculiar arrangement of pipes located within the steam-chamber, and communicating with a hollow journal or axis of said mill, whereby the steam is discharged into said chamber from a number of different orifices upon opposite or different sides of the mill, for the purpose of evenly distributing the steam around the outer surface of the inner casing, and thereby preventing too great a heat at any one point, which might burn or injure the leather contained in the mill.

My invention further consists in the use, in combination with a steam-heated revolving mill, of a thermometer, so applied thereto that the bulb shall be within the chamber the temperature of which it is desired to know, while the column of mercury or spirit and the graduated scale is on the exterior of the mill, all so arranged that while the thermometer revolves with the mill it shall retain substantially a perpendicular position in all positions of the mill.

Figure 1:
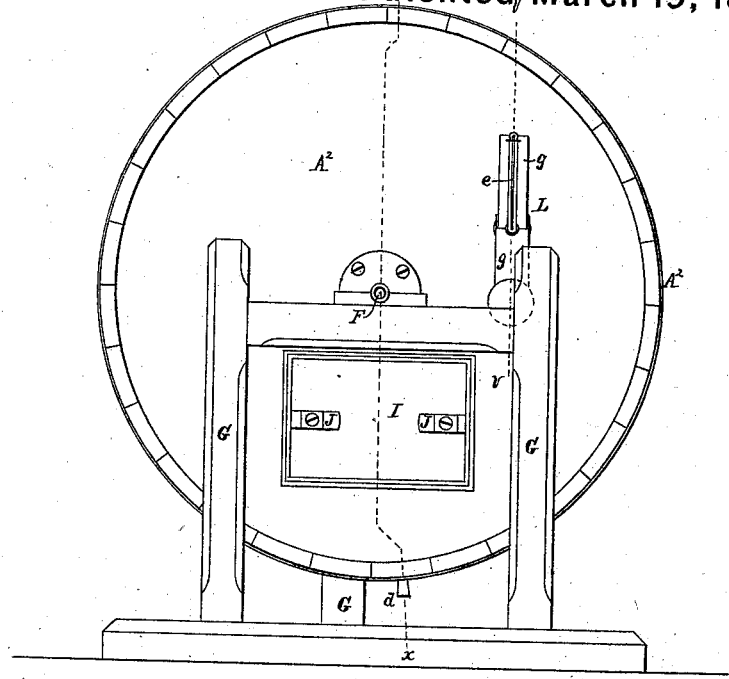
Figure 3:
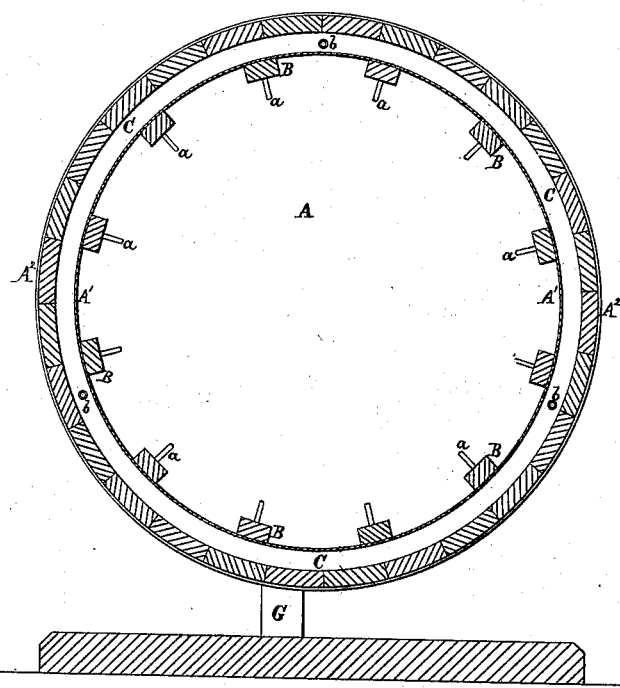
Figure 2:
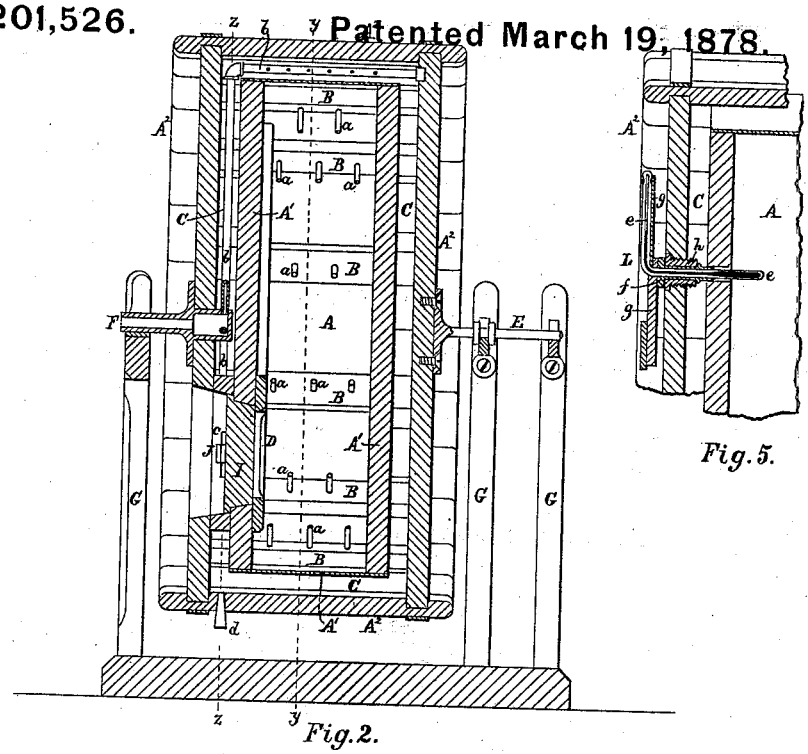
Figure 5:
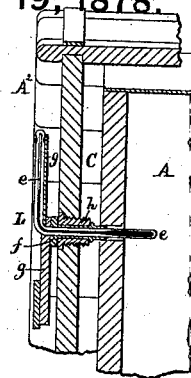
Figure 4:
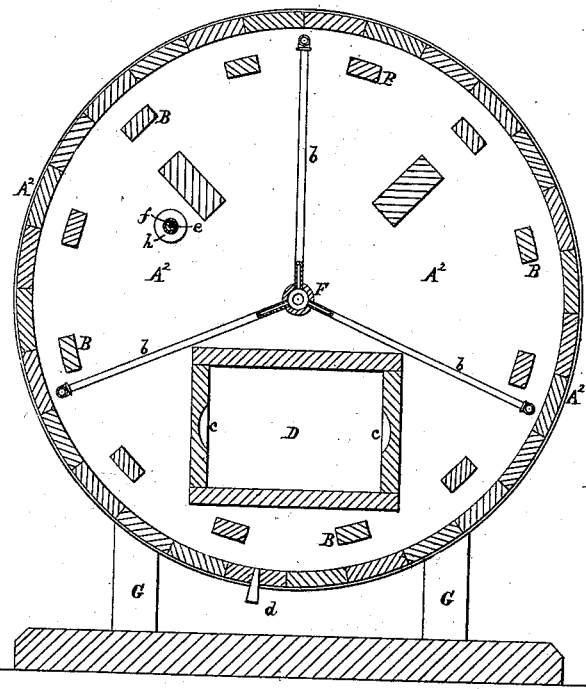

Figure 1 of the drawings is a side elevation; Fig. 2, a vertical section on line $x\,x$ on Fig. 1; Fig. 3, a vertical section on line $y\,y$ on Fig. 2; Fig. 4, a vertical section on line $z\,z$ on Fig. 2, looking toward the outer casing; and Fig. 5 is a partial vertical section on line $v\,v$ on Fig. 1.

A is the inner chamber of the mill, made cylindrical in form, and provided with a series of bars, B, extending longitudinally thereof around its outer periphery, in the inner faces of each of which are set a series of inwardly-projecting round-pointed pins, $a\,a$, arranged and adapted to act upon the leather placed in the chamber A in a well-known manner.

The chamber A is formed by the inclosing inner casing $A^1$, which, in turn, is inclosed by the outer casing $A^2$, arranged parallel to and a short distance from the casing $A^1$, thus forming the chamber C, completely surrounding the inner casing and its inclosed chamber, except where the opening D communicates with said inner chamber, as will be presently described.

The outer casing $A^2$ has secured to one side or end thereof the shaft E, and to the other end the hollow shaft F, through which steam may be admitted to the chamber C.

The mill is mounted, by means of the shafts E and F, in suitable bearing upon the frames G G, in such a manner that it may be readily and easily revolved about its axis.

The shaft E may have secured thereon a spur-gear, into which meshes a spur-pinion, for imparting to the mill the desired rotary motion.

The hollow shaft F protrudes through the casing $A^2$ into the chamber C, and has its inner end closed, as shown, and has screwed into the sides thereof two or more pipes, $b\,b$, which extend radially therefrom toward the periphery of the mill, and then parallel to the axis of the mill in the chamber C, said pipes having a series of small perforations made in each side thereof, all so arranged that the steam admitted to the hollow shaft F will be discharged into the chamber C through a large number of small orifices evenly distributed about the chamber C, thus avoiding the danger of overheating the chamber A at one point, and thereby causing injury to the leather placed therein, which would be likely to occur if the steam were allowed to impinge with full force upon the casing $A^1$ opposite to the hollow shaft F.

A rectangular opening, D, is made through the casings A¹ and A² into the chamber A, through which the leather and stuffing material may be placed in the chamber or removed therefrom, said casings being connected together around said opening, so as to make the chamber C steam-tight.

I is a door or cover, fitted to the opening D, so as to close it with a liquid-tight joint, said cover being held in place by means of the buttons J J, which engage with recesses $c\ c$, formed in the casing surrounding the opening D, as shown; or the cover may be held in position in any other well-known manner.

L is a thermometer, the tube $e$ of which is bent at right angles and fitted to a tubular journal or sleeve, $f$, formed upon or secured to the plate $g$, to which the tube $e$ is secured, said sleeve $f$ being fitted to and adapted to revolve in the sleeve or tube $h$, secured by steam-tight joints in and connecting the outer and inner casings, as shown in Fig. 5. The plate $g$ extends some distance below the sleeve $f$, and is weighted, so that it will maintain a perpendicular position in any position of the revolving mill.

The operation of my improved mill is as follows: The leather to be stuffed is placed in the chamber A, together with a suitable quantity of grease or other stuffing material, at a temperature of about 120°, and the cover I is then secured in position to close the opening D. Steam is then admitted to the chamber C through the hollow shaft F and pipes $b\ b$, and the mill is made to revolve about its axis, the leather contained in the chamber A being carried upward, as the mill revolves, to near the upper side of the chamber, when it falls to the bottom, striking upon the round-pointed pins $a\ a$, thus bending and working the leather, and opening its pores to receive the stuffing material in a well-known manner, the temperature in the chamber A being maintained at about 120° by the steam contained in the chamber C.

I am aware that a thermometer arranged as above described, with a portion of its tube outside of the mill, will not indicate the exact temperature within the inner chamber; but when it is considered that the temperature within the mill may vary from 110° to 130° without any injurious effects being produced, that the temperature in the building outside of the mill is usually kept at 60° to 70°, or about one-half of that within the mill, and that very much the largest part of the mercury or spirit contained in the thermometer is within the chamber of the mill exposed to the higher temperature, it will be seen that the difference between the indicated temperature and the real temperature of the mill will not be so great, but that, by means of such an indication, the temperature within the mill may be readily regulated and kept within the limits of safety and successful working of the machine.

When the temperature in the chamber A rises too high the supply of steam is cut off, and, if necessary, the passage $d$ is opened to allow the steam in the chamber C to escape.

The water caused by the condensation of the steam in the chamber C may also be drawn off through the passage $d$.

I do not claim, broadly, the employment of steam in connection with a leather-stuffing mill, as I am aware that a stuffing-mill consisting of a single cylindrical chamber has been made to revolve within a fixed or stationary chamber filled with steam; but such an arrangement has been found to be objectionable on account of the waste of steam and the annoyance occasioned by allowing the steam in the chamber to escape into the building every time the mill is opened to discharge its contents and recharge it, as is necessarily the case where the steam-chamber is stationary and the mill revolves therein.

I am also aware that steam has been used to heat the stuffing-chamber by passing it through a coil of pipe located in a stationary chamber upon one side of and communicating with said stuffing-chamber, as described in Letters Patent No. 78,835, dated June 9, 1868; and also that steam has been admitted to small chambers placed within the stuffing-chamber, near its center, which inner chambers revolved with the stuffing-chamber, as described in Letters Patent No. 75,890, dated March 24, 1868; but in both of these cases there was great liability of overheating one part of the chamber, while other parts of the chamber remained at too low a temperature, and hence the present invention, which entirely overcomes these difficulties by virtue of the steam being evenly distributed over the whole outer surface of the inner or stuffing chamber, and impinging thereon at a great number of points in the form of small jets, instead of having the whole force of the steam applied at one point upon the exterior or interior of said stuffing-chamber. I do not, therefore, claim anything shown and described in the Letters Patent above cited; but

What I claim as new, and desire to secure by Letters Patent of the United States, is—

1. A leather-stuffing mill provided with the inner chamber A, to receive the leather, and the steam-chamber C, surrounding and enveloping the chamber A and revolving therewith, in combination with a device for admitting steam to the chamber C during its revolution, substantially as described.

2. A leather-stuffing mill provided with the inner chamber A, to receive the leather, and the steam-chamber C, surrounding and enveloping the chamber A and revolving therewith, in combination with the door I and the hollow shaft F, all arranged and adapted to operate substantially as and for the purposes described.

3. The combination, in a leather-stuffing mill, of the chamber A, to receive the leather and the stuffing material, the steam-chamber C, surrounding and enveloping the chamber A, the hollow shaft F, having its inner end closed, and one or more perforated pipes, $b\ b$, communicating with said hollow shaft F, and extending radially therefrom to the outer periphery of the chamber C, all arranged and adapted to operate substantially as and for the purposes described.

4. In combination with a steam-heated revolving chamber, the bent thermometer-tube $e$, sleeves $f$ and $h$, and the weighted plate $g$, all arranged and adapted to operate substantially as and for the purposes described.

Executed at Boston, Massachusetts, this 9th day of January, A. D. 1878.

JOSEPH W. HILDRETH.

Witnesses:
  N. C. LOMBARD,
  C. H. DODD.